United States Patent
Hong et al.

(10) Patent No.: US 9,526,124 B2
(45) Date of Patent: Dec. 20, 2016

(54) WIRELESS COMMUNICATION METHOD AND APPARATUS

(75) Inventors: Sung-soo Hong, Seoul (KR);
Chang-seog Ko, Hwaseong-si (KR);
Pil-seung Yang, Suwon-si (KR);
Chang-hwan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 762 days.

(21) Appl. No.: 12/646,272

(22) Filed: Dec. 23, 2009

(65) Prior Publication Data

US 2010/0216399 A1 Aug. 26, 2010

(30) Foreign Application Priority Data

Feb. 25, 2009 (KR) .......................... 10-2009-0015868

(51) Int. Cl.
*H04B 7/00* (2006.01)
*H04W 76/02* (2009.01)
*H04W 48/08* (2009.01)
*H04W 88/06* (2009.01)
*H04W 92/18* (2009.01)

(52) U.S. Cl.
CPC ........... *H04W 76/023* (2013.01); *H04W 48/08* (2013.01); *H04W 88/06* (2013.01); *H04W 92/18* (2013.01)

(58) Field of Classification Search
CPC . G06K 7/0008; H04M 2250/02; H04W 76/02; H04W 84/18; H04W 76/023
USPC ................................ 455/41.1, 41.2, 41.3, 39
See application file for complete search history.

(56) References Cited

U.S. PATENT DOCUMENTS

| 6,324,577 | B1* | 11/2001 | Hirai | ...................... H04L 12/24 370/254 |
| 7,409,231 | B2 | 8/2008 | Oba et al. | |
| 7,787,425 | B2* | 8/2010 | Yun | ...................... H04W 36/08 370/331 |
| 8,457,651 | B2* | 6/2013 | Forutanpour | ......... G06F 1/1694 345/156 |
| 8,526,885 | B2* | 9/2013 | Lin | ...................... H04M 1/7253 340/12.51 |
| 8,527,987 | B2* | 9/2013 | Johansson | ................. G06F 8/61 455/41.1 |

(Continued)

FOREIGN PATENT DOCUMENTS

| KR | 10-2004-0028668 A | 4/2004 |
| KR | 10-2009-0002848 A | 1/2009 |

(Continued)

OTHER PUBLICATIONS

System and Method for Dynamic Automatic Communication Path Selection, Distributed Device Synchronization and Task Delegation. Provisional U.S. Appl. No. 61/098,886 by Bonar.*

(Continued)

*Primary Examiner* — MD Talukder
(74) *Attorney, Agent, or Firm* — Sughrue Mion, PLLC

(57) ABSTRACT

Provided are wireless communication method and apparatus. The wireless communication method includes: receiving wireless communication module information of a second terminal from the second terminal through a first communicator of a first terminal; and performing a wireless communication with the second terminal using the wireless communication module information through a second communicator of the first terminal.

19 Claims, 5 Drawing Sheets

(56) References Cited

U.S. PATENT DOCUMENTS

| | | | | |
|---|---|---|---|---|
| 8,559,350 B2* | 10/2013 | Kuehnel | ............... | H04W 8/005 370/312 |
| 8,660,492 B2* | 2/2014 | Hong | ................ | H04M 1/72561 455/41.2 |
| 9,088,961 B1* | 7/2015 | Davis | .................... | H04W 76/00 |
| 2002/0120671 A1* | 8/2002 | Daffner | ............... | H04L 12/2602 709/201 |
| 2004/0048570 A1* | 3/2004 | Oba | ...................... | G06F 1/1626 455/41.1 |
| 2004/0162027 A1* | 8/2004 | Chang | ................ | H04M 1/7253 455/41.2 |
| 2007/0141988 A1* | 6/2007 | Kuehnel | ............... | H04W 8/005 455/41.2 |
| 2007/0197256 A1* | 8/2007 | Lu | .......................... | H04B 1/406 455/552.1 |
| 2007/0264991 A1* | 11/2007 | Jones | ................. | H04M 1/7253 455/420 |
| 2009/0011707 A1* | 1/2009 | Ko | .......................... | H04W 4/02 455/41.2 |
| 2009/0061769 A1* | 3/2009 | Zimbric | ............. | H04M 1/7253 455/41.2 |
| 2009/0239468 A1* | 9/2009 | He | ..................... | H04L 63/0853 455/41.2 |
| 2010/0079260 A1* | 4/2010 | Kiesel et al. | .............. | 340/10.51 |
| 2010/0081385 A1* | 4/2010 | Lin | .................... | H04M 1/7253 455/41.3 |
| 2010/0120364 A1* | 5/2010 | Lee | ...................... | H04W 8/005 455/41.2 |
| 2010/0124196 A1* | 5/2010 | Bonar | ................. | H04B 7/0689 370/329 |
| 2010/0216399 A1* | 8/2010 | Hong | .................. | H04W 76/023 455/41.2 |
| 2010/0278345 A1* | 11/2010 | Alsina | ................ | H04L 63/0492 380/283 |
| 2011/0143661 A1* | 6/2011 | Hartwig | .................... | G06F 8/65 455/41.1 |
| 2011/0276961 A1* | 11/2011 | Johansson | ................. | G06F 8/61 717/178 |
| 2013/0167215 A1* | 6/2013 | Yang | ....................... | G06F 21/35 726/7 |
| 2015/0043427 A1* | 2/2015 | K.M. | ..................... | H04W 8/005 370/328 |
| 2016/0043779 A1* | 2/2016 | Maeda | ................. | H04B 5/0056 455/41.1 |

FOREIGN PATENT DOCUMENTS

| | | | | |
|---|---|---|---|---|
| WO | | 2008134991 A1 | 11/2008 | |
| WO | WO 2013016084 A1 * | | 1/2013 | ............ H04W 8/005 |

OTHER PUBLICATIONS

Communication, Issued by the Korean Intellectual Property Office, Dated Oct. 20, 2014, in counterpart Korean Application No. 10-2009-0015868.

Communication dated Apr. 24, 2015, issued by the Korean Intellectual Property Office in counterpart Korean Application No. 10-2009-0015868.

Communication from the Korean Intellectual Property Office dated Jul. 28, 2015 in a counterpart Korean application No. 10-2015-0073095.

* cited by examiner

FIG. 3

```
ConnectionSupport = {Bluetooth,WiFi,WUSB}          TYPES OF WIRELESS
ConnectionType::Bluetooth                          COMMUNICATION METHODS
{                                                  SUPPORTED BY SECOND
    Bluetooth:Password = "1627";                   TERMINAL
    Bluetooth:Address = "00166c25dd2d";
    Bluetooth:... = "...";
    ...
}
ConnectionType::WiFi
{                                                  INFORMATION FOR WIRELESS
    WiFi:MacAddress = "00-13-77-47-2f-19";         COMMUNICATION CONNECTIONS
    WiFi:DHCPEnable = enable;                      FOR EACH WIRELESS
    WiFi:WEPEnable = enable;                       COMMUNICATION METHODS
    WiFi:... "...";
    ...
}
ConnectionType::...
{
    ...
```

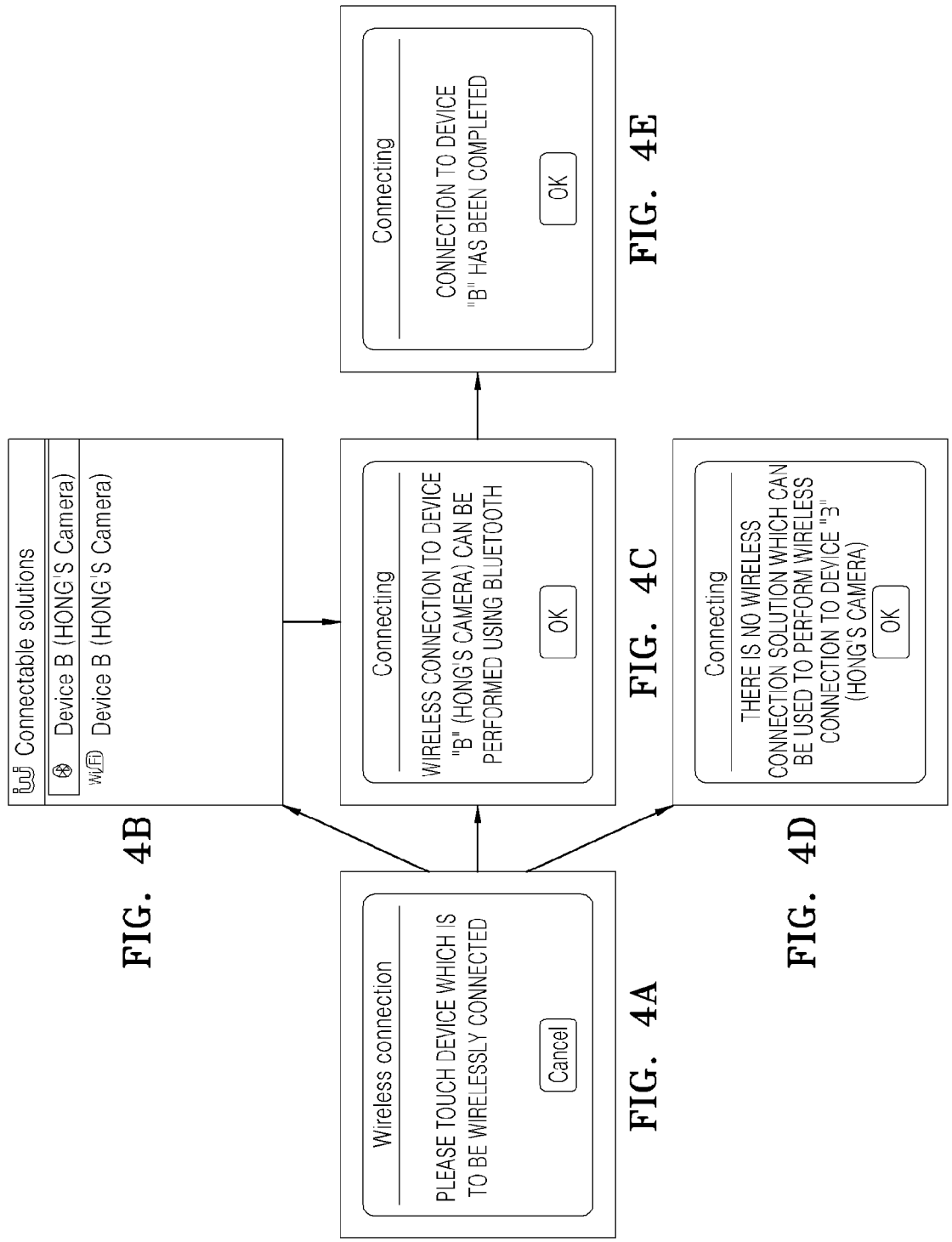

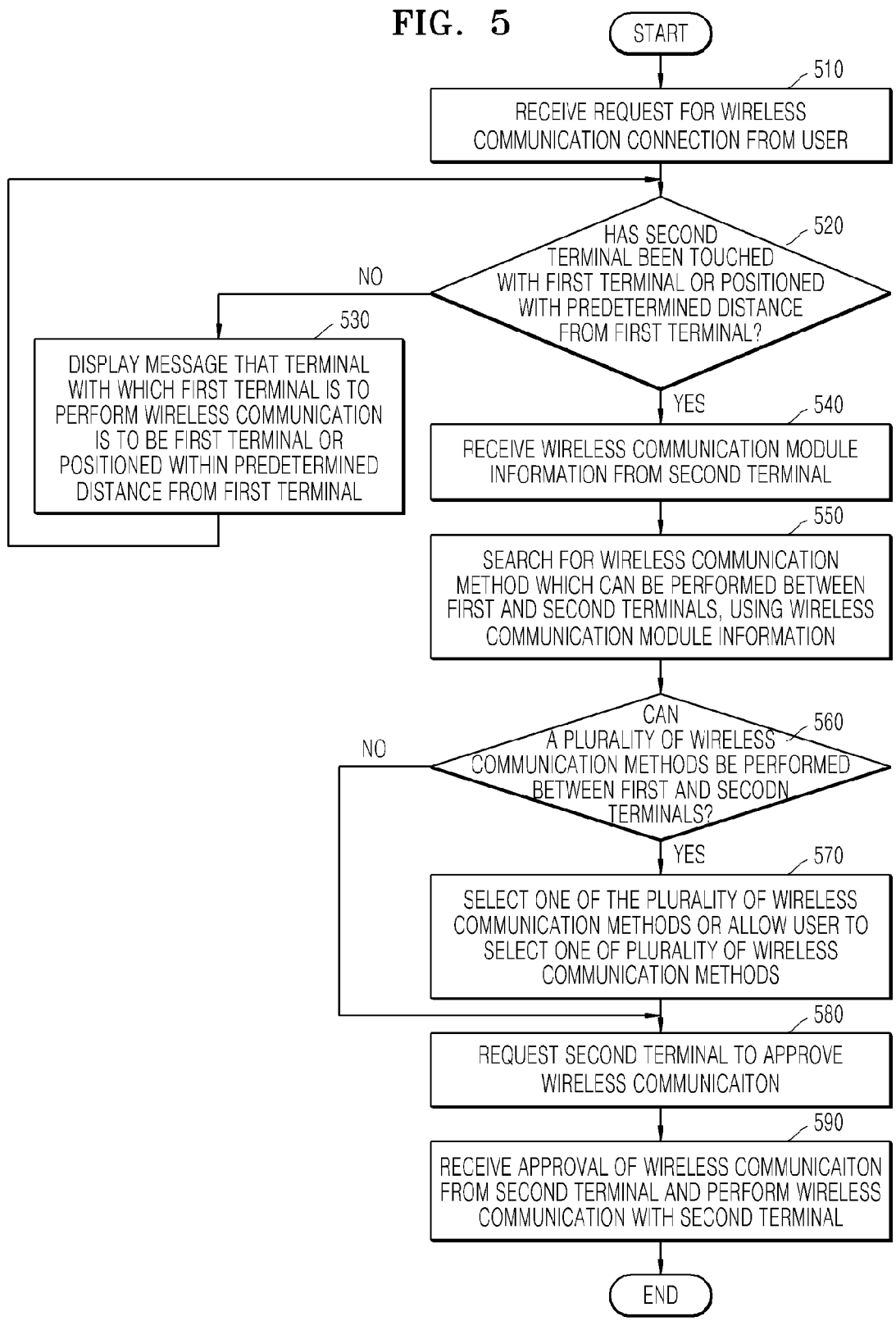

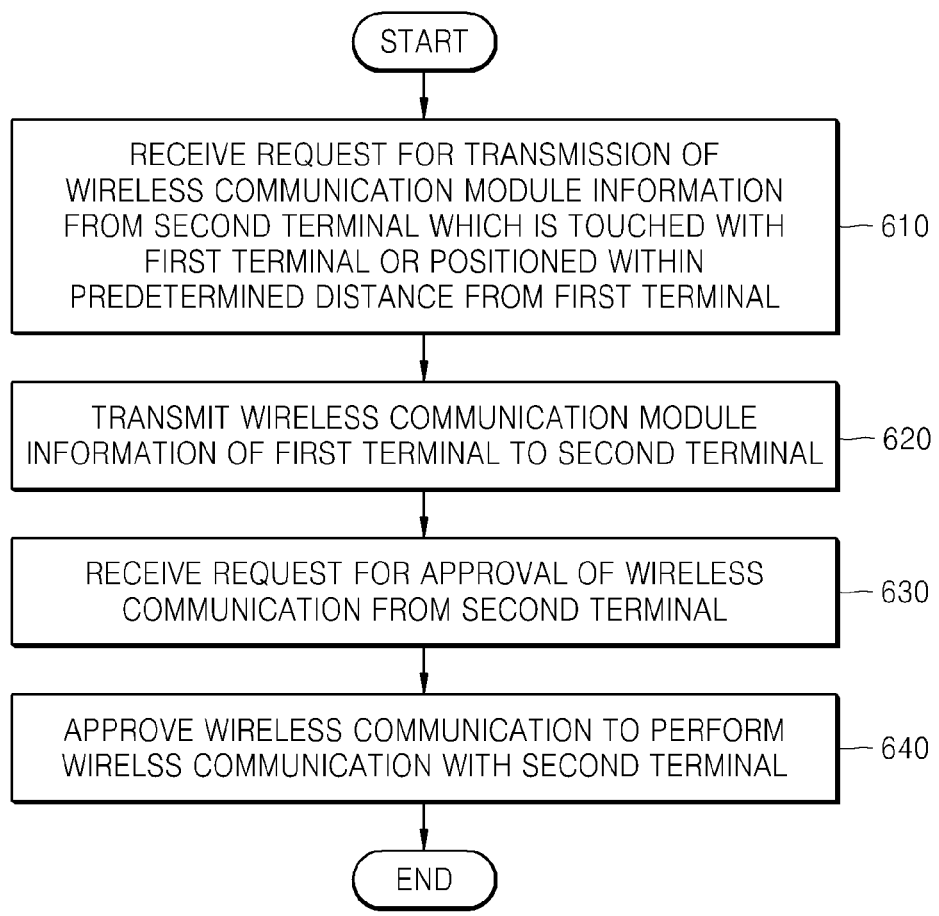

WIRELESS COMMUNICATION METHOD AND APPARATUS

CROSS-REFERENCE TO RELATED PATENT APPLICATION

This application claims the benefit of Korean Patent Application No. 10-2009-0015868, filed on Feb. 25, 2009, in the Korean Intellectual Property Office, the disclosure of which is incorporated herein in its entirety by reference.

BACKGROUND OF THE INVENTION

1. Field of the Invention

Methods and apparatuses consistent with the present invention relate to wireless communication, and more particularly, to wireless communication method and apparatus for simply starting a wireless communication connection.

2. Description of the Related Art

Wireless communication technology has been developed to allow devices to be connected to a network without wiring and with freedom of movement. Various types of digital devices are able to wirelessly interchange information due to the development of the wireless communication technology.

SUMMARY OF THE INVENTION

Exemplary embodiments of the present invention provide wireless communication method and apparatus for simply starting a wireless communication connection.

According to an aspect of the present invention, there is provided a wireless communication method performed by a first terminal, including: receiving wireless communication module information of a second terminal from the second terminal through a first communicator; and performing a wireless communication with the second terminal through a second communicator using the wireless communication module information.

If the second terminal is connected to the first terminal, the wireless communication module information may be received from the second terminal. If the second terminal is positioned within a predetermined distance from the first terminal, the wireless communication module information may be received from the second terminal. The wireless communication method may further include: if a plurality of terminals are positioned within the predetermined distance from the first terminal, allowing a user to select the second terminal from the plurality of terminals. The wireless communication method may further include displaying information about the plurality of terminals positioned within the predetermined distance from the first terminal.

The wireless communication method may further include displaying a message that a terminal with which the first terminal is to perform a wireless communication is to be connected to the first terminal or is to be positioned within a predetermined distance. The wireless communication module information may be received using one or more of wireless communication methods of infrared communication technologies which are based on wireless local area network (WLAN), Bluetooth, Zigbee, wireless broadband internet (WiBro), wireless universal serial bus (WUSB), radio frequency identification (RFID), or infrared data association (IrDA) technology.

The wireless communication module information may include information indicating types of wireless communication methods supported by the second terminal and information for starting wireless communication connections according to the wireless communication method. The first terminal may perform the wireless communication with the second terminal using one or more of wireless communication methods of infrared communication technologies which are based on WLAN, Bluetooth, Zigbee, WiBro, WUSB, RFID, or IrDA technology. The wireless communication method may further include searching for a wireless communication method which may be performed between the first and second terminals, using the wireless communication module information of the second terminal. The wireless communication method may further include: if a plurality of wireless communication methods are searched, selecting one of the plurality of wireless communication methods or allowing the user to select one of the plurality of wireless communication methods. The wireless communication method may further include displaying information about the plurality of wireless communication methods.

The performance of the wireless communication with the second terminal may include requesting the second terminal to approve the wireless communication using the wireless communication module information. The performance of the wireless communication with the second terminal may include receiving the approval of the wireless communication from the second terminal in order to perform the wireless communication with the second terminal in response to the request of the second terminal for the wireless communication.

According to another aspect of the present invention, there is provided a first terminal performing a wireless communication, including: a first communicator which receives wireless communication module information of a second terminal from the second terminal; and a second communicator which performs the wireless communication with the second terminal using the wireless communication module information.

According to another aspect of the present invention, there is provided a wireless communication method performed by a first terminal, including: transmitting wireless communication module information of the first terminal to a second terminal through a first communicator; requesting the second terminal to approve a wireless communication through a second communicator using the wireless communication module information of the first terminal; and approving the request for the wireless communication through the second communicator in order to perform the wireless communication with the second terminal.

According to another aspect of the present invention, there is provided a first terminal performing a wireless communication, including: a first communicator which transmits wireless communication module information of the first terminal to a second terminal; and a second communicator which receives a request for an approval of the wireless communication from the second terminal, approves the wireless communication, and performs the wireless communication with the second terminal using the wireless communication module information of the first terminal.

According to the present invention, wireless communication method and apparatus for further simply starting a wireless communication connection may be provided.

BRIEF DESCRIPTION OF THE DRAWINGS

The above and other features and aspects of the present invention will become more apparent by describing in detail exemplary embodiments thereof with reference to the attached drawings in which:

FIG. 3 illustrates wireless communication module information according to an exemplary embodiment of the present invention;

FIGS. 4A through 4E illustrate screens output through a display unit 160 of FIG. 2, according to exemplary embodiments of the present invention;

FIG. 5 is a flowchart of a wireless communication method performed by the first terminal 100, according to an exemplary embodiment of the present invention; and FIG. 6 is a flowchart of a wireless communication method according to another exemplary embodiment of the present invention.

DETAILED DESCRIPTION OF THE INVENTION

The present invention will now be described more fully with reference to the accompanying drawings, in which exemplary embodiments of the invention are shown.

Figure 1:
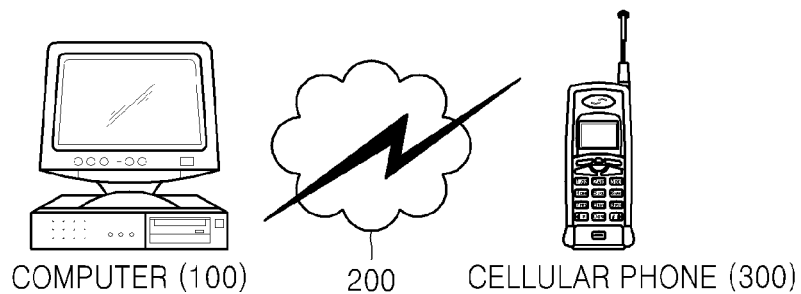
FIG. 1 illustrates a wireless communication system according to an exemplary embodiment of the present invention.

FIG. 1 illustrates a wireless communication system according to an exemplary embodiment of the present invention. Referring to FIG. 1, the wireless communication system of the present exemplary embodiment includes a first terminal 100, a second terminal 300, and a wireless communication network 200. The first and second terminals 100 and 300 are digital devices which perform a wireless communication through the wireless communication network 200. Each of the first and second terminals 100 and 300 includes a communication unit (not shown) for performing a wireless communication method according to the present invention. The first and second terminals 100 and 300 may be headsets, cameras, camcorders, personal digital assistants (PDAs), portable multimedia players (PMPs), cellular phones, digital televisions (TVs), navigation systems, personal computers (PCs), notebook computers including ultra mobile PCs (UMPCs), or the like including wireless communication modules.

In FIG. 1, the first terminal 100 is a PC, and the second terminal 300 is a cellular phone. If a user requests the first terminal 100 to perform a wireless communication with another terminal, the first terminal 100 searches for a terminal, which can perform the wireless communication with the first terminal 100, around the first terminal 100. In other words, the first terminal 100 searches for a terminal which is touched with, i.e., placed in physical contact with or be in physical contact with, the first terminal 100 or is positioned within a predetermined distance from the first terminal 100 and requests the searched for terminal, i.e., the discovered terminal, to transmit wireless communication module information of the discovered terminal.

The user may position the first and second terminals 100 and 300 within a predetermined distance with each other or touch the first and second terminals 100 and 300 to each other so that the first terminal 100 performs the wireless communication with the second terminal 300. The second terminal 300 extracts its wireless communication module information and transmits the wireless communication module information to the first terminal 100 in response to the request of the first terminal 100 for a transmission of the wireless communication module information.

Each of the first and second terminals 100 and 300 includes one or more wireless communication modules which are based on a wireless local area network (WLAN), Bluetooth, Zigbee, wireless broadband internet (WiBro), a wireless universal serial bus (WUSB), radio frequency identification (RFID), or infrared data association (IrDA), in order to transmit and receive the wireless communication module information.

For example, a communication module of each of the first and second terminals 100 and 300 may be an RFID module including an RFID tag and an RFID reader.

The RFID reader of the first terminal 100 may receive a radio frequency from the RFID tag of the second terminal 300 to use information recorded in the RFID tag of the second terminal 300 using an electromagnetic wave. If the wireless communication module information of the second terminal 300 is stored in the RFID tag of the second terminal 300, the first terminal 100 may receive the wireless communication module information from the second terminal 300 through the RFID reader.

The wireless communication module information of the second terminal 300 includes information indicating a wireless communication method supported by the second terminal 300 and information for starting a wireless communication connection according to the wireless communication method. If the second terminal 300 supports a plurality of wireless communication methods, the wireless communication module information of the second terminal 300 includes information for starting a wireless communication connection according to each of the plurality of wireless communication methods.

The first terminal 100 searches for a wireless communication method which can be performed between the first and second terminals 100 and 300, using the wireless communication module information of the second terminal 300. In the exemplary embodiment of the present invention, the wireless communication method which can be performed between the first and second terminals 100 and 300 refers to a method of connecting the first and second terminals 100 and 300 to each other through a wireless communication connection to wirelessly transmit and receive information. The method may be equal to the wireless communication method used by the first terminal 100 to receive the wireless communication module information from the second terminal 300 or may not be equal to the wireless communication method.

If a plurality of wireless communication methods can be performed between the first and second terminals 100 and 300, the first terminal 100 may select one of the plurality of wireless communication methods automatically or according to predetermined priority. If necessary, the first terminal 100 may display information about the plurality of wireless communication methods so as to assist the user to select one of the plurality of wireless communication methods.

The first terminal 100 may request the second terminal 300 to approve the wireless communication using the information for starting the wireless communication connection to the second terminal 300, wherein the information is included in the wireless communication module information. If the second terminal 300 approves the request of the first terminal 100 for the wireless communication, the first and second terminals 100 and 300 perform the wireless communication with each other.

In the exemplary embodiment of the present embodiment as described above, the first terminal 100 requests the second terminal 300, which is positioned within the predetermined distance from the first terminal 100 or touched with the first terminal 100, to transmit the wireless communication module information, receives the wireless communication module information from the second terminal 300, and simply performs the wireless communication with the second terminal 300 using the received wireless communication module information.

Figure 2:
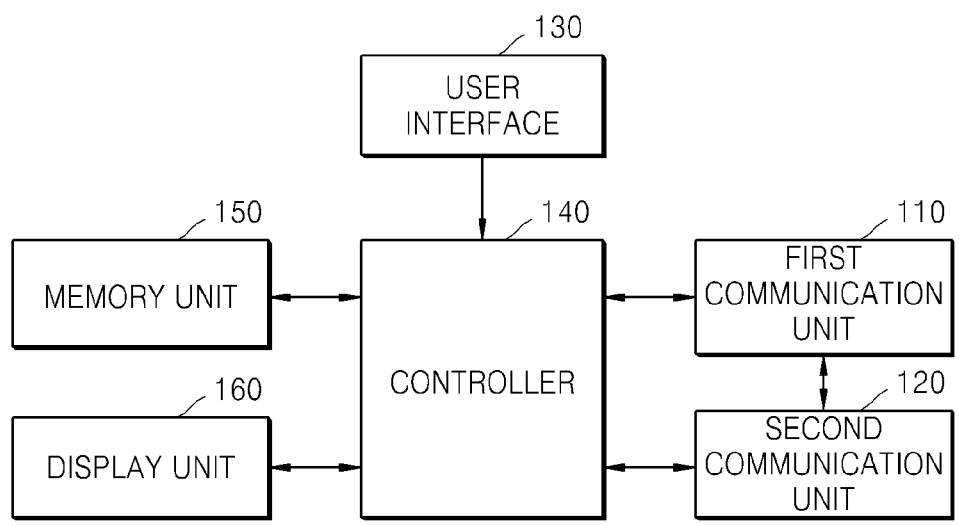
FIG. 2 is a block diagram of a first terminal 100 of FIG. 1.

FIG. 2 is a block diagram of the first terminal 100 of FIG. 1. Referring to FIG. 2, the first terminal 100 includes a first communicator 110, a second communicator 120, a user interface 130, a controller 140, a memory unit 150, and a display unit 160. In an exemplary embodiment, the first and the second communicators 110 and 120 are communication units. Elements of the first terminal 100 are shown in FIG. 2, but the second terminal 300, which can perform the wireless communication with the first terminal 100, may include elements performing the same functions as those of the first terminal 100 shown in FIG. 2. The first communicator 100 includes one or more wireless communication modules which transmit or receive the wireless communication module information using one of infrared communication technologies which are based on WLAN, Bluetooth, Zigbee, WiBro, WUSB, RFID, or IrDA technology.

Wireless communication methods, which are to be used by digital devices, may be provided in various forms according to characteristics of the digital devices. Wireless communication technology may be classified into an IrDA-based infrared communication method and a radio frequency (RF) communication method. Examples of the RF communication method include WLAN including Wi-Fi technology, Bluetooth, Zigbee, WiBro, and WUSB technologies. The RF communication method also includes RFID technology for identifying an ID using an electromagnetic wave to recognize an object.

Several types of wireless communication technologies are used in different fields according to their characteristics and adopt different wireless communication connection processes. Therefore, a user of a digital device should know what types of wireless communication methods are used in the digital device in order to perform wireless communication connections. The user should also know how a wireless communication connection will be performed with respect to each of the wireless communication methods. Several complicated steps should be performed to connect a wireless communication between digital devices.

A wireless communication apparatus for simplifying a complicated wireless communication connection process is disclosed in the present invention.

The first communicator 110 may request a terminal to transmit wireless communication module information using its wireless communication modules and receive the wireless communication module information of the terminal from the terminal. If the wireless communication modules of the first communicator 110 are RFID modules, the first communicator 110 may include an RFID tag and an RFID reader.

The first communicator 110 may include a distance sensor. The distance sensor senses whether another terminal capable of performing a wireless communication with the first terminal 100 is positioned around the first terminal 100. If the user requests the first terminal 100 to perform a wireless communication with a terminal around the first terminal 100 through the user interface 130, the distance sensor searches for a terminal which is positioned within a predetermined distance from the first terminal 100 or touched with the first terminal 100. If the distance sensor senses the second terminal 300 as the terminal positioned within the predetermined distance from the first terminal 100 or touched with the first terminal 100, the distance sensor activates the wireless communication modules of the first communicator 110. The wireless communication modules of the first communicator 110 receive the wireless communication module information of the second terminal 300 from the second terminal 300.

The second communicator 120 requests the second terminal 300 to approve the wireless communication connection using the wireless communication module information that the first communicator 110 has received, receives the approval of the wireless communication connection from the second terminal 300, and wirelessly transmits and/or receives information with the second terminal 300. The second communicator 120 includes one or more wireless communication modules which perform wireless communications with other terminals using one of infrared communication technologies which are based on WLAN, Bluetooth, Zigbee, WiBro, WUSB, RFID, or IrDA technology The first and second communicators 110 and 120 may include the same types of wireless communication modules or different types of wireless communication modules. This indicates that a wireless communication method used by the first terminal 100 to receive the wireless communication module information from the second terminal 300 may be the same as or different from a wireless communication method used by the first terminal 100 to request the second terminal 300 to approve the wireless communication connection and perform the wireless communication with the second terminal 300 if the second terminal 300 approves the request of the first terminal 100.

The first and second communicators 110 and 120 are separate from each other in FIG. 2, but the present invention is not limited thereto. The first terminal 100 may include a communication unit into which the first and second communicators 110 and 120 are integrated. In this case, the communication unit may request another terminal to transmit wireless communication module information using one communication module, receive the wireless communication module information from the another terminal, and perform a wireless communication connection to the another terminal using the wireless communication module information in order to perform a wireless communication with the another terminal. The controller 140 controls an overall operation of the first terminal 100 in order to perform a wireless communication method according to the present invention. The controller 140 includes an arithmetic logic unit (ALU) which performs computations and a register which temporarily stores data and commands.

If the first communicator 110 receives the wireless communication module information of the second terminal from the second terminal 300, the controller 140 searches for a wireless communication method which can be performed between the first and second terminals 100 and 300, using the wireless communication module information of the second terminal 300. For example, the second communicator 120 of the first terminal 100 may include a Bluetooth module performing a wireless communication using Bluetooth technology and a WLAN module performing a wireless communication using WLAN technology, and the second terminal 300 may include only a Bluetooth module performing a wireless communication using Bluetooth technology.

The wireless communication module information of the second terminal 300 includes information indicating types of wireless communication methods which can be performed by the second terminal 300. Thus, the controller 140 may recognize that the second terminal 300 performs only the wireless communication using Bluetooth technology, using the wireless communication module information of the second terminal 300.

The controller 140 senses whether the second communicator 120 includes a Bluetooth module which can perform a wireless communication with the second terminal 300. If the controller 140 senses that the second communicator 120 includes the Bluetooth module, the controller 140 activates the Bluetooth module. The second communicator 120 may request the second terminal 300 to perform a Bluetooth communication, using information for a Bluetooth communication connection, wherein the information is included in the wireless communication module information of the second terminal 300. If the second terminal 300 approves the request of the first terminal 100 for the Bluetooth communication, the second communicator 120 of the first terminal 100 starts a wireless communication with the second terminal 300 using Bluetooth technology.

The memory unit 150 stores a program for driving the first terminal 100, a program for performing wireless communications between the first terminal 100 and other terminals, and the like. The memory unit 150 includes a high-speed main memory of storage medium type such as a random access memory (RAM), a read only memory (ROM), or the like, a secondary memory of long-term storage medium type such as a floppy disk, hard disk, a tape, a compact disc ROM (CD-ROM), a flash memory, or the like, and a data storage device such as an electric storage medium, a magnetic storage medium, an optical storage medium, or the like.

The display unit 160 outputs an overall state of the first terminal 100, information input from the user through the user interface 130, and the like through a screen or a speaker. The display unit 160 may include a screen outputting a video signal, a speaker outputting an audio signal, and the like. If a plurality of terminals are positioned within a predetermine distance from the first terminal 100 or touched with the first terminal 100, the display unit 160 may display information about the plurality of terminals on the screen so that the user selects one of the plurality of terminals. If a plurality of wireless communication methods can be performed between the first and second terminals 100 and 300, the display unit 160 may display information about the plurality of wireless communication methods on the screen so that the user selects one of the plurality of wireless communication methods.

The user interface 130 receives commands, characters, figures, audio information, or the like using a physical transducer such as a keyboard, a mouse, a touch pad, a touch screen, or a microphone and informs the controller 140 of the received information. If a plurality of terminals are positioned within a predetermined distance from the first terminal 100 or touched with the first terminal 100, the user may select one of the plurality of terminal using the user interface 130. If a plurality of wireless communication methods can be performed between the first and second terminals 100 and 300, the user may select one of the plurality of wireless communication methods using the user interface 130.

In the present exemplary embodiment, the user performs a wireless communication connection to another device using the first terminal 100. Alternatively, the user may perform a wireless communication connection to a terminal positioned around the second terminal using the second terminal 300.

The second terminal 300 may include two communication units which perform the same functions as the first and second communicators 110 and 120 of the first terminal 100, in order to perform the wireless communication with the first terminal 100. The communication unit of the second terminal 300 performing the same function as the first communicator 110 of the first terminal 100 is referred to as a third communicator (not shown). Also, the communication unit of the second terminal 300 performing the same function as the second communicator 120 of the first terminal 100 is referred to as a fourth communicator (not shown).

If the second terminal 300 receives the request for the wireless communication connection from the user, the second terminal 300 activates the third communicator. The third communicator of the second terminal 300 searches for a terminal which is positioned around the second terminal 300 so as to perform a wireless communication with the second terminal 300, using the same method as that used by the first communicator 110 of the first terminal 100. If the second terminal 300 searches for the first terminal 100 which is touched with the second terminal 300 or positioned within a predetermined distance from the second terminal 300, the third communicator of the second terminal 300 may request the first communicator 110 of the first terminal 100 to transmit wireless communication module information. The first communicator 110 of the first terminal 100 extracts its wireless communication module information and transmits the wireless communication module information to the third communicator of the second terminal 300 in response to the request of the second terminal 300 for the transmission of the wireless communication module information.

The fourth communicator of the second terminal 300 searches for a wireless communication method which can be performed between the first and second terminals 100 and 300, using the wireless communication module information of the first terminal 100. The fourth communicator of the second terminal 300 extracts information for performing the searched wireless communication method from the wireless communication module information of the first terminal 100 and requests the second communicator 120 of the terminal 100 to approve a wireless communication connection using the extracted information.

The second communicator 120 of the first terminal 100 may approve the wireless communication connection and perform a wireless communication in respond to the request of the fourth communicator of the second terminal 300.

In the present exemplary embodiment as described above, the first terminal 100 receives the wireless communication module information from the second terminal 300 which is positioned within the predetermined distance from the first terminal 100 or touched with the first terminal 100, requests the second terminal 300 to approve the wireless communication using the wireless communication module information, and starts the wireless communication connection using a simple method regardless of a type of the second terminal 300. The first terminal 100 also transmits its wireless communication module information to the second terminal 300 in response to the request of the second terminal 300 for the transmission of the wireless communication module information, receives the request for the approval of the wireless communication from the second terminal 300, and approves the wireless communication in order to perform the wireless communication with the second terminal 300.

FIG. 3 illustrates wireless communication module information of the second terminal 300, according to an exemplary embodiment of the present invention. The wireless communication module information includes information indicating what types of wireless communication methods are supported by the second terminal 300. Referring to FIG.

3, examples of the wireless communication methods supported by the second terminal 300 include Bluetooth, Wi-Fi, and WUSB technologies.

The wireless communication module information includes information for performing the wireless communication methods supported by the second terminal 300, i.e., information for starting wireless communications supported by the second terminal 300. If the second terminal 300 supports a plurality of wireless communication methods, the wireless communication module information includes information for a wireless communication connection according to each of the plurality of wireless communication methods. The wireless communication module information of FIG. 3 includes information for connecting a wireless communication according to each of Bluetooth, Wi-Fi, and WUSB technologies which are wireless communication methods supported by the second terminal 300.

If a user requests the first terminal 100 to perform a wireless communication, the first terminal 100 receives the wireless communication module information of the second terminal 300 from the second terminal 300 which is positioned around or touched with the first terminal 100 and determines what type of wireless communication method is supported by the second terminal 300, using the wireless communication module information of the second terminal 300. The first terminal 100 searches for a wireless communication method that the first terminal 100 can perform, among the wireless communication methods supported by the second terminal 300. For example, if the wireless communication method that the first terminal 100 is able to perform among the wireless communication methods supported by the second terminal 300 is the Bluetooth technology, the first terminal 100 extracts information for a Bluetooth communication connection from the wireless communication module information of the second terminal 300 and requests the second terminal 300 to approve a wireless communication connection using the Bluetooth technology, using the extracted information.

FIGS. 4A through 4E illustrate screens output through the display unit 160 of FIG. 2, according to exemplary embodiments of the present invention. If the user of the first terminal 100 requests the first terminal 100 to perform wireless communications with wireless communication devices positioned around the first terminal 100 through the user interface 130, the first terminal 100 searches for a terminal which can perform a wireless communication with the first terminal 100, around the first terminal 100. If there is no terminal which can perform the wireless communication with the first terminal 100, around the first terminal 100, the display unit 160 displays a message that a terminal which is to perform a wireless communication with the first terminal 100 is to be touched with the first terminal 100 or to be positioned within a predetermined distance from the first terminal 100, on a screen as shown in FIG. 4A.

If there is a terminal which is positioned within a predetermined distance from the first terminal 100 or touched with the first terminal 100, around the first terminal 100, the first terminal 100 requests the terminal to transmit wireless communication module information. When the terminal positioned within the predetermined distance from the first terminal 100 or touched with the first terminal 100 is referred to as device "B," the device "B" transmits its wireless communication module information to the first terminal 100 in response to the request of the first terminal 100. The first communicator 110 receives the wireless communication module information from the device "B" and determines whether wireless communication methods to be performed by the device "B" include a wireless communication method to be performed by the second communicator 120 of the first terminal 100.

If there is no wireless communication method which can be performed between the device "B" and the second communicator 120, the display unit 160 displays a message that there is no wireless communication method which can be performed with the device "B," on a screen as shown in FIG. 4D.

If there are a plurality of wireless communication methods which can be performed between the device "B" and the second communicator 120, the display unit 160 displays the plurality of wireless communication methods according to types of the wireless communication methods on a screen as shown in FIG. 4B. The user may select a desired wireless communication method on the screen of FIG. 4B using the user interface 130.

If the user selects the desired wireless communication method on the screen of FIG. 4B or there is one wireless communication method which can be performed between the device "B" and the second communicator 120, the display unit 160 displays a message that the first terminal 100 can perform a wireless communication with the device "B" using one selected wireless communication method, on a screen as shown in FIG. 4C. If there is one wireless communication method which can be performed between the device "B" and the second communicator 120, the display unit 160 of the first terminal 100 may immediately perform a wireless communication with the device "B" without outputting the screen shown in FIG. 4C. The second communicator 120 transmits information for connecting a wireless communication to the device "B" using the wireless communication module information of the device "B" to request for the device "B" to approve a wireless communication connection. If the device "B" approves the request of the first terminal 100 for the wireless communication connection, the first terminal 100 perform the wireless communication with the device "B." In this case, the display unit 160 displays a message that the wireless communication connection to the device "B" has been completed, on a screen as shown in FIG. 4E.

FIG. 5 is a flowchart of a wireless communication method performed by the first terminal 100, according to an embodiment of the present invention. In operation S510, the first terminal 100 receives a request for a wireless communication connection to a device positioned around the first terminal 100 from a user. In operation S520, the first terminal 100 activates the first communicator 110 to determine whether the second terminal 300 has been touched with the first terminal 100 or positioned within a predetermined distance from the first terminal 100. If it is determined in operation S520 that the second terminal 300 has not been touched with the first terminal 100 or not been positioned within the predetermined distance from the first terminal 100, in operation S530, the first terminal 100 displays a message that a terminal with which the first terminal 100 is to perform a wireless communication is to be touched with the first terminal 100 or positioned within a predetermined distance from the first terminal 100.

If it is determined in operation S520 that the second terminal 300 has been touched with the first terminal 100 or positioned within the predetermined distance from the first terminal 100, in operation S540, the first communicator 110 of the first terminal 100 requests the second terminal 300 to transmit wireless communication module information and receives the wireless communication module information from the second terminal 300. In operation S550, the first terminal 100 searches for a wireless communication method which can be performed between the first and second terminals 100 and 300, using the wireless communication module information of the second terminal 300.

In operation S560, the first terminal 100 determines whether a plurality of wireless communication methods can be performed between the first and second terminals 100 and 300. If it is determined in operation S560 that the plurality of wireless communication methods can be performed between the first and second terminals 100 and 300, in operation S570, the first terminal 100 selects one of the plurality of wireless communication methods randomly or according to priority or allows a user to select one of the plurality of wireless communication methods through the user interface 130.

If it is not determined in operation S560 that the plurality of wireless communication methods can be performed between the first and second terminals 100 and 300, in operation S580, the first terminal 100 extracts information for a predetermined wireless communication connection from the wireless communication module information of the second terminal 300 and requests the second terminal 300 to approve a wireless communication using the extracted information in order to perform a predetermined wireless communication with the second terminal 300.

In operation S590, the first terminal 100 performs the predetermined wireless communication with the second terminal 300 according to the approval of the second terminal 300.

FIG. 6 is a flowchart of a wireless communication method according to another exemplary embodiment of the present invention. If a user requests the second terminal 300 to perform wireless communications with devices positioned around the second terminal 300, the second terminal 300 searches for devices which can perform wireless communications with the second terminal 300, around the second terminal 300 and requests the devices to transmit wireless communication module information.

If the device searched for by the second terminal 300 is the first terminal 100, the second terminal 300 requests the first terminal 100 to transmit wireless communication module information in operation S610. In operation S620, the first communicator 110 of the first terminal 100 transmits the wireless communication module information of the first terminal 100 to the second terminal 300 according to the request of the second terminal 300.

The second terminal 300 searches for a wireless communication method which can be performed between the first and second terminals 100 and 300, using the wireless communication module information of the first terminal 100. In operation S630, the second terminal 300 transmits information for a wireless communication connection for performing the searched wireless communication method to the first terminal 100 in order to request the first terminal 100 to approve a wireless communication. In operation S640, the first terminal 100 approves the request of the second terminal 300 for the wireless communication so as to start the wireless communication between the first and second terminals 100 and 300.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A first terminal comprising:
a first communicator configured to receive, from a second terminal using a first communication method, communication information for establishing respective wireless connections for a plurality of wireless communication methods supported by the second terminal, and the communication information comprising respective addresses for the plurality of wireless communication methods; and
a controller configured to search for at least one available wireless communication method between the first and the second terminals from among the plurality of wireless communication methods based on the received communication information;
a display configured to display a plurality of available wireless communication methods found by the controller in response to the searching by the controller yielding the plurality of available wireless communication methods from among the plurality of wireless communication methods;
a user interface configured to receive a user input for selecting a second communication method from among the displayed plurality of available wireless communication methods; and
a second communicator configured to establish a wireless connection with the second terminal using the second communication method based on information for establishing the wireless connection for the second communication manner method included in the received communication information,
wherein, in response to the searching by the controller yielding only one available wireless communication method, which is the second communication method, from among the plurality of wireless communication methods, the second communicator is configured to establish a wireless connection with the second terminal using the second communication method based on information for establishing the wireless connection for the second communication method included in the received communication information, and
wherein, in response to the searching by the controller yielding no available wireless communication method from among the plurality of wireless communication methods, the display is further configured to display a message indicating that there are no available wireless communication methods between the first and the second terminals.

2. The first terminal of claim 1, wherein the first communicator is configured to search for the second terminal which is touched with the first terminal or positioned within a predetermined distance from the first terminal, and receive the communication information from the searched second terminal.

3. The first terminal of claim 2, wherein the user interface is configured to receive a user input for requesting the first terminal to perform a wireless communication with another terminal positioned in a vicinity of the first terminal, and the first communicator is configured to search for said another terminal which is touched with the first terminal or positioned within the predetermined distance from the first terminal.

4. The first terminal of claim 3, wherein, in response to the first communicator searching for a plurality of terminals which are touched with the first terminal or positioned within the predetermined distance from the first terminal, the display is configured to display information about the plurality of terminals found in the searching, the user interface is configured to receive a user input for selecting the second terminal from among the plurality of terminals found in the searching, and the first communicator is configured to request the second terminal to transmit the communication information.

5. The first terminal of claim 4, wherein, in response to the first communicator determining that no terminal is found which is touched with the first terminal or positioned within the predetermined distance from the first terminal, the display is configured to display a message indicating that the second terminal with which the first terminal is to perform the wireless communication is to be touched with the first terminal or to be positioned within the predetermined distance from the first terminal.

6. The first terminal of claim 1, wherein the second communicator is configured to request the second terminal to approve the wireless communication using the second communication method based on information for establishing the wireless connection for the second communication method included in the received communication information, receive approval for the wireless communication from the second terminal, and establish the wireless communication with the second terminal.

7. The first terminal of claim 1, wherein the first communication method is the same as the second communication method.

8. The first terminal of claim 1, wherein the first communicator is configured to receive the communication information using the first communication method which is one from among wireless communication methods including wireless local area network (WLAN), Bluetooth, Zigbee, wireless broadband (WiBro), wireless universal serial bus (WUSB), radio frequency identification (RFID), and infrared data association (IrDA) technologies.

9. The first terminal of claim 1, wherein the second communicator is configured to establish the wireless communication with the second terminal using the second communication method which is one from among wireless communication methods including WLAN, Bluetooth, Zigbee, WiBro, WUSB, RFID, and IrDA technologies.

10. A wireless communication method performed by a first terminal comprising a first communicator and a second communicator, comprising:
  receiving, from a second terminal using a first communication method through the first communicator, communication information for establishing respective wireless connections for a plurality of wireless communication methods supported by the second terminal, and the communication information comprising respective addresses for the plurality of wireless communication methods; and
  searching for an available wireless communication method between the first and the second terminals from among the plurality of wireless communication methods based on the received communication information;
  displaying a plurality of available wireless communication methods in response to the searching yielding the plurality of available wireless communication methods from among the plurality of wireless communication methods;
  receiving a user input for selecting a second communication method from among the displayed available wireless communication methods;
  establishing a wireless connection with the second terminal using the second communication method through the second communicator based on information for establishing the wireless connection for the second communication method included in the received communication information,
  in response to the searching yielding that only the second communication method is available from among the plurality of wireless communication methods, establishing a wireless connection with the second terminal using the second communication method through the second communicator based on information for establishing the wireless connection for the second communication method included in the received communication information, and
  in response to the searching yielding that no wireless communication methods from among the plurality of wireless communication ma s are available, displaying a message indicating that there are no available wireless communication method between the first terminal and the second terminal.

11. The wireless communication method of claim 10, further comprising:
  searching for the second terminal which is touched with the first terminal or positioned within a predetermined distance from the first terminal through the first communicator.

12. The wireless communication method of claim 11, wherein the searching for the second terminal comprises:
  receiving a user input for requesting the first terminal to perform a wireless communication with another terminal positioned in a vicinity of the first terminal, and
  searching for said another terminal which is touched with the first terminal or positioned within the predetermined distance from the first terminal through the first communicator.

13. The wireless communication method of claim 12, further comprising:
  in response to finding in said searching a plurality of terminals which are touched with the first terminal or positioned within the predetermined distance from the first terminal, displaying information about the found plurality of terminals,
  receiving a user input for selecting the second terminal from among the found plurality of terminals, and
  requesting the second terminal to transmit the communication information through the first communicator.

14. The wireless communication method of claim 13, further comprising:
  if no terminal which is touched with the first terminal or positioned within the predetermined distance from the first terminal is found in said searching, displaying a message indicating the second terminal with which the first terminal is to perform the wireless communication is to be touched with the first terminal or to be positioned within the predetermined distance from the first terminal.

15. The wireless communication method of claim 10, wherein the establishing the wireless connection with the second terminal comprises:
  requesting the second terminal to approve the wireless communication using the second communication method through the second communicator based on information for establishing the wireless connection for the second communication method included in the received communication information;

receiving approval for the wireless communication from the second terminal; and establishing the wireless communication with the second terminal.

16. The wireless communication method of claim 10, wherein the first communication method is the same as the second communication method.

17. The wireless communication method of claim 10, wherein the first communicator is configured to receive the communication information using the first communication method which is one from among wireless communication methods including wireless local area network (WLAN), Bluetooth, Zigbee, wireless broadband (WiBro), wireless universal serial bus (WUSB), radio frequency identification (RFID), and infrared data association (IrDA) technologies.

18. The wireless communication method of claim 10, wherein the second communicator is configured to establish the wireless communication with the second terminal using the second communication method which is one from among wireless communication methods including WLAN, Bluetooth, Zigbee, WiBro, WUSB, RFID, and IrDA technologies.

19. A non-transitory computer-readable recording medium having embodied thereon a program for implementing the wireless communication method of claim 10.

* * * * *